Nov. 10, 1964  V. A. WINKLER  3,156,224
HEAD GASKET FOR DIESEL ENGINE
Filed July 8, 1963  2 Sheets-Sheet 1

Vladimir A. Winkler
INVENTOR.

BY Bertram H. Mann
ATTORNEY

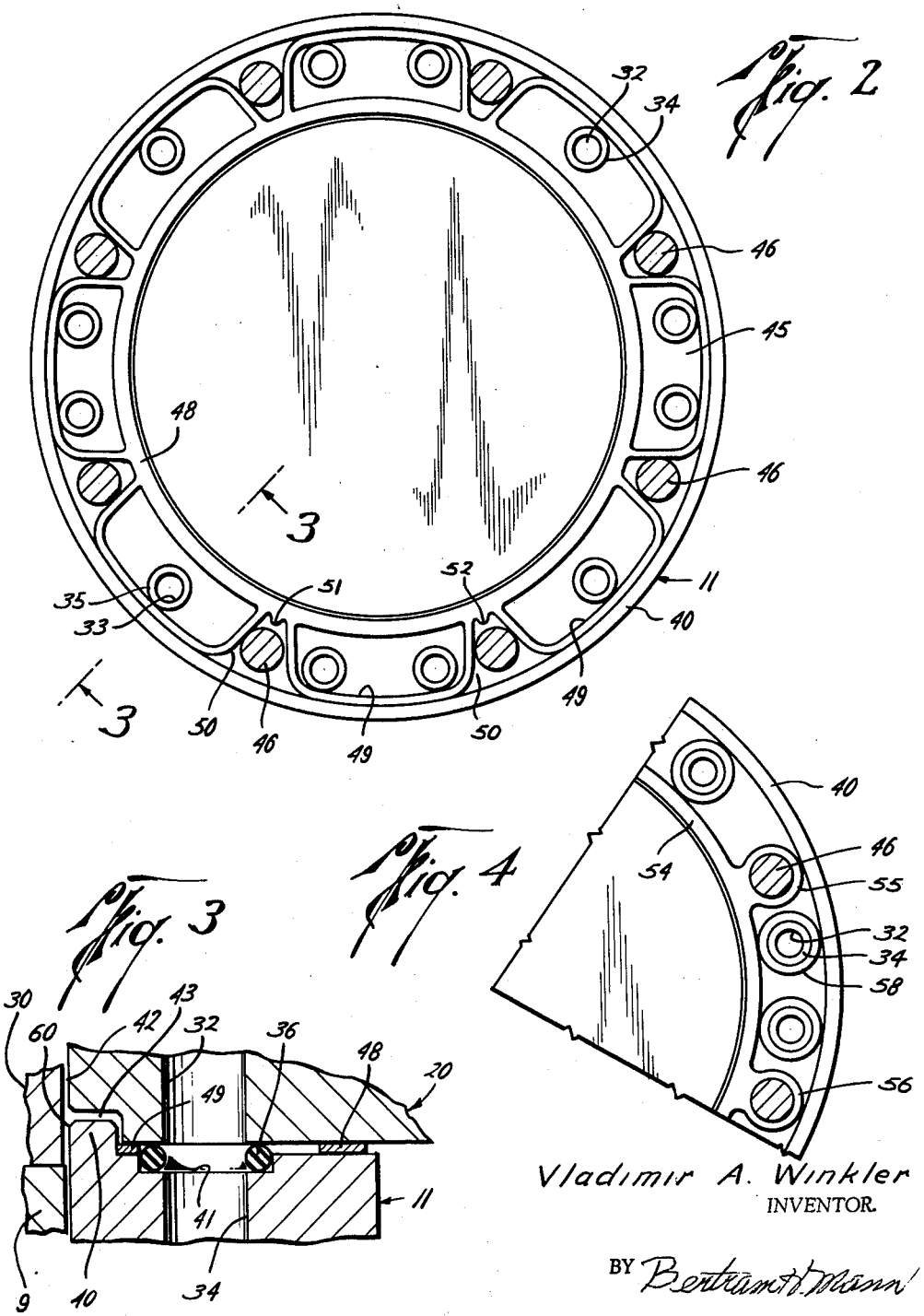

United States Patent Office 3,156,224
Patented Nov. 10, 1964

3,156,224
HEAD GASKET FOR DIESEL ENGINE
Vladimir A. Winkler, 4010 Calendar St., Houston 9, Tex.
Filed July 8, 1963, Ser. No. 293,477
5 Claims. (Cl. 123—41.83)

This invention relates to gasketing for internal combustion engines, particularly the cooling water passages thereof which may be exposed to hot, corrosive exhaust gases.

The majority of diesel-electric locomotives as now utilized are powered by two-cycle, water-cooled diesel engines having cylinder banks at 45° to each other. The main body of the engine is formed of pressed sheets and forgings properly secured together and forming in the lower part a crankcase, in the intermediate part an air box, and in the upper part a cooling water chamber. The cylinders are formed by cylinder liner structures each of which is mounted and secured at the proper angle in the engine body sheets which are bored appropriately to accommodate the cylinders. These pilot bores for the cylinders are larger than the outside diameters of the cylinder liners to facilitate insertion and removal of the liners. Bolted to the upper surfaces of the cylinder liner is a cylinder head structure which includes the exhaust ports and valves, the fuel injector, and cooling water cavities. Bored water passages extend between the cylinder liners and head structure and through the abutting surfaces thereof. Water seal rings are provided between these abutting surfaces and encompassing the water passages. Also, according to current practice, a metal gasket is provided between the abutting surfaces and beween the cylinder and the water passages for preventing leakage of hot, high pressure combustion gases from the cylinder. This gasket, as now used, is a narrow circular band having projecting loops punched out to fit over the stud bolts which secure the liner and head together.

The narrow band gasket is used, instead of a full width gasket, to provide maximum compression of the gasket area without excessively stressing the studs. Some of the water seal rings are located very close to exhaust passages and, therefore, are subjected to high temperatures which lead to premature failure of these gasket seals. Also, these water seals are exposed to exhaust gases which may penetrate between the abutting surfaces of the cylinder liner and head, particularly in case of the slightest back pressure or exhaust pulsations in the exhaust system.

Another reason for a failure of the water seals is that even insignificant scratches on the surface of the seals originally, or caused by particles such as scale or rust flakes entrained with the cooling water which travels at a high velocity through the drilled passages, may result in a break of the seal in a relatively short period of time.

Failure of the water seal in the above type of engine may be very damaging. Ordinarily, leaking water will flow outwardly and downwardly into the air box, whence it is carried into the cylinder air ports and may only affect cylinder lubrication. However, after some length of service, the upper liner bore in the engine body may become clogged with exhaust carbon whereupon any water leak from the drilled passage between the head and the cylinder liner accumulates around the cylinder head and, ultimately, enters the exhaust ports and cylinder. Then when attempt is made to start the engine, this water becomes trapped in the cylinder and results in severe shock which may result in bending or twisting of the connecting rod. This, in turn, sets up stresses in the connecting rod which lead to metal fatigue and ultimately breakage of the connecting rod in service. The broken connecting rod destroys the corresponding as well as the opposed cylinder assembly of the V-engine. In most cases of such failure, the engine structure in the failed region is also damaged, resulting in a very expensive repair operation as well as out of service time for the locomotive.

Accordingly, an object of the present invention is to provide means in an engine of the above type for more effectively protecting the water passage seal between the cylinder liner and head from deleterious effects of heat and hot exhaust gases, whether from the cylinder or from the nearby exhaust passage.

Another object is to provide a novel gasketing system for V-type, two-cycle diesel engines of the type utilized in powering diesel-electric locomotives.

These objects and others are attained in general by providing a novel combustion gas resisting gasket, preferably of relatively soft metal, which completely surrounds the engine cylinder and has loops, either integral or separately formed, which encompass the water passage seals for completely protecting them from exhaust gases.

In the accompanying drawings which illustrate the invention,

FIG. 2 is an enlarged view of the top surface of one of the cylinder liners showing the novel gasket system applied thereto.

FIG. 3 is a further enlarged detail section taken substantially on line 3—3 of FIG. 2 and showing associated engine parts.

FIG. 4 is a fragmentary view similar to FIG. 2 but showing a modification.

Figure 1:
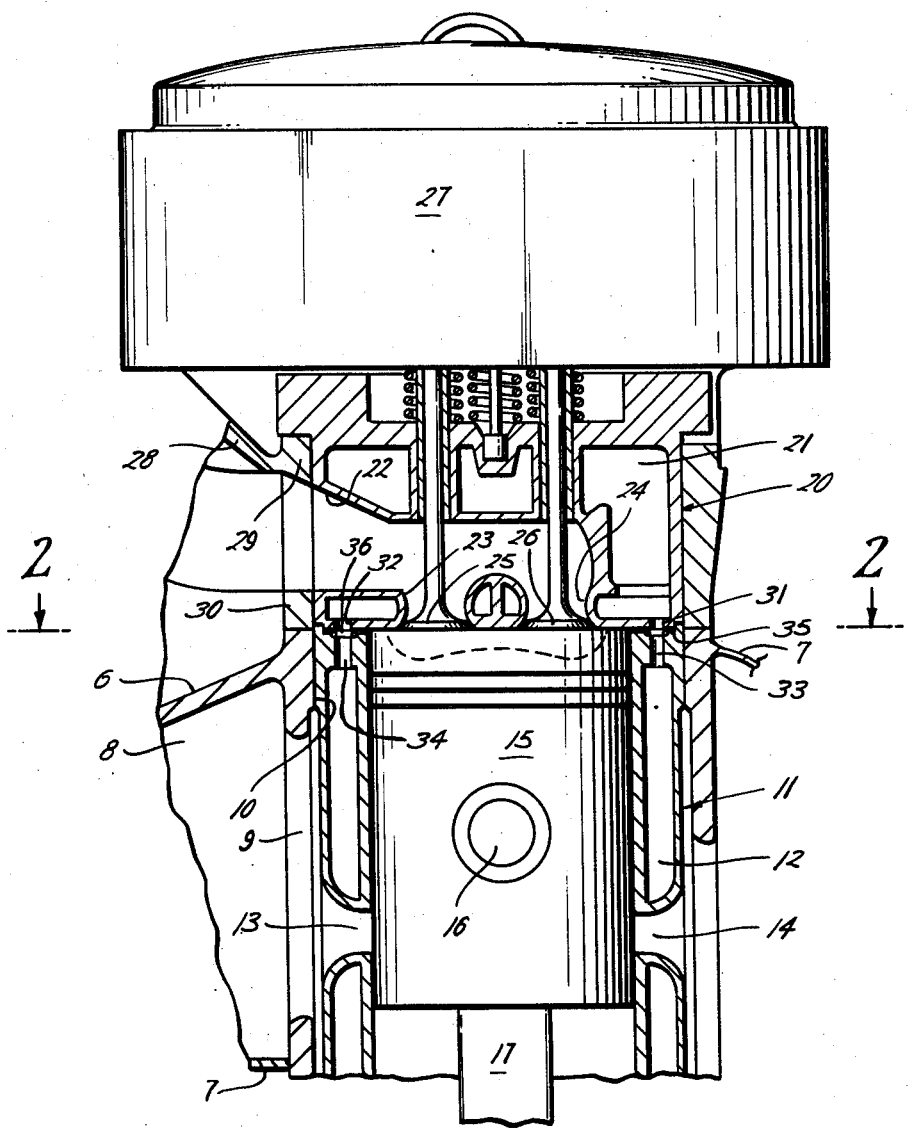
FIG. 1 is a partial vertical transverse section through a portion of a two-cycle diesel engine embodying the invention.

FIG. 1 shows top deck plates 6 and 7 forming the air box portions 8 of the cylinder body of a two-stroke cycle diesel engine of the V-type commonly used for powering diesel-electric locomotives. Secured to these plates are generally cylindrical structures 9 forming inclined pilot bores, as at 10, for reception of cylinder liners or bodies, generally designated 11. These liners have encompassing cooling water cavities 12 and air intake ports 13 and 14 communicating with the air box 8. Working within the cylindrical interior of each line 11 is an engine piston 15 connected by a wrist pin 16 to the connecting rod 17 leading to the crankshaft (not shown).

Mounted on and secured to the upper surfaces of the cylinder liners, as by bolts (not shown) is a cylinder head structure 20 having cooling water spaces 21 and forming exhaust passaging as 22 opening through ports 23 and 24, controlled by exhaust valves 25 and 26, into the engine cylinder. The fuel injector and valve operating mechanism (not shown) also are mounted on the head and protected by deck cover 27. Exhaust passaging 22 in the head structure communicates with a part 28 of the exhaust manifold having flange elements 29 and 30 bolted against the head structure about exhaust passaging 22 therein. The water spaces 21 in the head structure are connected through bores 31 and 32 in the head structure and aligned bores 33 and 34 in the cylinder liner with water pockets 12 in the liner. These bores are sealed by means of O-ring or D-ring seals 35 and 36 of suitable elastomeric material surrounding the bores and compressed between the abutting faces of the cylinder head structure and liner.

As best illustrated in FIG. 3, the liner 11 is provided with an upstanding peripheral flange or rib 40 for properly positioning the head structure and has counterbores, as 41, surrounding water bores 34, etc. A slight clearance, as at 42, is provided between the head structure and the manifold flange part 30 and pilot bore forming part 9 to facilitate admission of the cylinder liners into the body structure and the removal of the liners therefrom. This clearance 42 also provides communication between exhaust passaging 22 and the clearance 43 between opposed faces of liner rib 40 and the head whence exhaust gases under some circumstances may reach the vicinity of water seal gasket 36. Also, due to the proximity of this water seal gasket to the exhaust passaging, it is customarily subjected to substantial heat from the exhaust gases. This heat and/or the heating and corrosive effects of the exhaust gases themselves may seriously deteriorate the water seal gasket.

In order to protect gasket 36 both from the hot, high pressure combustion gases formed in the firing chamber as well as exhaust gases which may leak through clearances 42 and 43, there is provided the novel head gasket system best shown in FIG. 2 which shows the upper annular surface 45 of one of the cylinder liners. Extending through this surface are the head-securing bolts 46 and water bores 33, 34, etc. provided with water sealing gaskets as at 35 and 36. The special head gasket is skeletonized and includes a relatively narrow ring portion 48 completely surrounding the inner edge of liner surface 45 so as to prevent the loss of combustion gases from the cylinder. Projecting outwardly from ring portion 48 at intervals therearound, are D-shaped loops 49 forming V-shaped clearances 50 therebetween for accommodating head bolts 46. Since bolts 46 and water bores 33, 34, etc. are not symmetrically positioned about the cylinder liner, some of the gasket loops 49 completely encompass one water bore and its protecting gasket while others of these loops encompass a pair of such water bores and gaskets. To facilitate proper positioning of the gasket, certain V-shaped clearances 50 are provided with index features, as 51 and 52, which must be associated with certain marked head bolts. Two of such features are provided so that the gasket is made reversible. The exhaust gasket 48, 49 is formed of suitable exhaust resistant material, such as copper-clad steel.

In the modification shown in FIG. 4, the exhaust gasket has a relatively narrow inner ring portion 54 and outwardly projecting loops 55, 56, which encompass head bolts 46. However, water seal gaskets, as 57, are protected by separate copper clad exhaust gasket rings, as 58.

Thus, in both forms of the invention, the most effective elastomeric water seal gaskets may be used and these are fully protected by gasketing which is properly resistant to the heat pressure and corrosive effect of combustion and exhaust gases. A much more effective and long-lasting water seal, accordingly, is provided. Ordinarily, water leaking past seals 36 may pass through clearances 43 and 42 thence downwardly through the pilot bore into the air box. Such water, being drawn back into the cylinders, ordinarily, merely affects the lubrication thereof. However, in some cases, carbon may build up in clearance 42 at the region 60 in FIG. 3 and, thereby, prevent the water from leaking outwardly and downwardly into the air box. Such water may be forced upwardly through clearance 42 into the exhaust passaging, thence may enter the cylinders through the exhaust ports. In the case of a turbo-charged engine, this clearance 42 is usually sealed off with a seal ring which also would have the effect of preventing the escape of leaking water outwardly through the air box. In case of accumulation of water in the cylinder, when attempt is made to start the engine, this water becomes trapped in the cylinder and, being incompressible, results in severe shock to the piston. This hydraulic shock, in most instances, results in bending or twisting the connecting rod, thus causing the setting up of stresses in the connecting rod which lead to metal fatigue and ultimately breakage of the connecting rod in service. The broken connecting rod destroys the cylinder assembly as well as the opposed cylinder of the V-engine.

Accordingly, the novel head gasketing herein disclosed insures against the existence of a very serious problem which, heretofore, has resulted in occasional engine failures, expensive repair work, and out of service time of locomotive. The invention may be modified in various respects as will occur to those skilled in the art and the exclusive use of all modifications as come within the scope of the appended claims is contemplated.

I claim:

1. The combination with an internal combustion engine having cylinder liner and head members with opposed surfaces bolted together, a water passage extending transversely through said surfaces, and an exhaust passage adjacent and in communication with said surfaces, of a gasket ring between said surfaces and closely surrounding said passage for sealing said passage against water loss and a second gasket between said surfaces and having first and second parts, respectively, entirely surrounding the interior of said liner between said interior and said passage and said first gasket for protecting said first gasket against combustion gases from said liner interior and said exhaust passage.

2. The combination with internal combustion engine cylinder and head members having opposed surfaces bolted together, a plurality of water passages extending transversely through said surfaces and arranged about said cylinder, and an exhaust passage communicable with portions of said surfaces spaced from said cylinder, of a plurality of water seal gaskets between said surfaces and each encompassing one of said water passages, and a second, skeletonized gasket between said surfaces and having a part extending around said cylinder between the same and said water passages and parts encompassing said first gaskets for shielding the latter against exhaust gases from said cylinder and said exhaust passage.

3. The combination described in claim 2 in which said second gasket includes a circular first part and integral loops respectively surrounding said water passages and said first gaskets.

4. The combination described in claim 3 in which said first gaskets are of elastomeric material for water sealing and said second gaskets are of metal for withstanding the destructive effects of combustion gases.

5. The combination with an internal combustion engine of the type having a cylinder body with at least one cylinder, a head mounting surface surrounding said cylinder, and a peripheral flange extending normal to said surface, a cylinder head guidingly received within said flange and having a face opposing said body surface and a side wall intersecting said face, a cooling liquid transfer passage extending across said surface and said face, a liquid seal grommet surrounding said passage between said surface and said face, and an exhaust duct extending through said side wall of said head, of a skeletonized gasket of exhaust resistant material between said body and said head and having a ring part extending around the periphery of said cylinder and an integral outward loop surrounding said grommet to protect the same from exhaust gases leaking along said head, side wall, and face.

References Cited by the Examiner

UNITED STATES PATENTS

| | | | |
|---|---|---|---|
| 2,679,241 | 5/54 | Dickson | 123—193 |
| 2,710,602 | 6/55 | Maybach | 123—41.82 |
| 2,716,970 | 9/55 | King | 123—41.82 |

KARL J. ALBRECHT, *Acting Primary Examiner.*